United States Patent
Kimura et al.

(10) Patent No.: US 6,306,998 B1
(45) Date of Patent: Oct. 23, 2001

(54) ROOM TEMPERATURE FAST CURABLE COMPOSITION

(75) Inventors: Tsuneo Kimura; Masayuki Ikeno, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/512,651

(22) Filed: Feb. 24, 2000

(30) Foreign Application Priority Data

Feb. 26, 1999 (JP) .................................................. 11-049281

(51) Int. Cl.[7] .................................................... C08G 77/16
(52) U.S. Cl. ................................ 528/12; 528/17; 528/26; 528/21; 528/901; 528/34
(58) Field of Search .................................. 528/17, 26, 21, 528/901, 12, 34

(56) References Cited

U.S. PATENT DOCUMENTS 3,919,136    11/1975   Smith .
5,319,050    6/1994    Kimura et al. .

FOREIGN PATENT DOCUMENTS 61-204289A    9/1986    (JP) .

Primary Examiner—Robert Dawson
Assistant Examiner—Kuo-Liang Peng
(74) Attorney, Agent, or Firm—Birch, Stewart, Kolasch & Birch, LLP

(57) ABSTRACT

Blending (A) a diorganopolysiloxane end-blocked with a hydroxyl group, (B) a hydrolyzable silane having ketoxime, alkoxy, acyloxy, amide or amino groups or a partial hydrolyzate thereof, (C) an organic compound having a C=O group, and (D) an organic compound having a $NH_2$ group gives a condensation curing type composition which is fast and deeply curable at room temperature.

5 Claims, No Drawings

ROOM TEMPERATURE FAST CURABLE COMPOSITION

This invention relates to room temperature fast curable compositions, and more particularly, to condensation curing type compositions which are fast and deeply curable at room temperature.

BACKGROUND OF THE INVENTION

Room temperature fast curable organopolysiloxane compositions of the condensation curing type known in the art include compositions of one part type comprising a both end hydroxy-terminated organopolysiloxane as a base polymer and a crosslinking agent in an amount minimized so as to increase the crosslinking rate through hydrolysis, and compositions of two part type wherein a both end hydroxy-terminated organopolysiloxane as a base polymer and a crosslinking agent are separately packed.

The compositions of one part type, however, are not regarded as fast curing since they merely have a high curing rate from the surface and require a certain time for deep curing. By contrast, the compositions of two part type are relatively fast in depth curing, but are difficult to handle on account of a mixing ratio of the two parts departing from 1:1 and thus inapplicable to an automatic mixing dispenser. In order to drive complete curing to depths, the quantity of hydroxyl at both ends of organopolysiloxane or polyoxyalkylene polymer and the quantity of crosslinking agent added must be strictly controlled, or water must be further added as a deep curing agent.

On the other hand, organopolysiloxane compositions of the addition curing type are efficient to work with since the two parts are mixed in a ratio of 1:1. However, the working environment is limited since a heating oven is generally necessary for curing and the curing catalyst can be poisoned in the presence of an addition poison.

To solve these problems, we proposed in U.S. Pat. No. 5,319,050 a composition comprising a diorganopolysiloxane blocked with a hydrolyzable silyl group at either end of its molecular chain, 0.001 to 1 mol of an organic compound having at least one C=O group in a molecule, and 0.001 to 1 mol of an organic compound having at least one $NH_2$ group in a molecule. This is a room temperature fast curable organopolysiloxane composition which utilizes water formed as a by-product by ketimine forming reaction between C=O and $NH_2$ groups. Continuing investigations, we found that when the diorganopolysiloxane as the base polymer is end-blocked with a hydrolyzable silyl group, the composition maintains storage stability etc., but its fast curing property does not significantly exceed that of conventional well-known two part type compositions wherein a both end hydroxy-terminated organopolysiloxane and a crosslinking agent are separately packed.

JP-A 61-204289 discloses a humidity-curable sealing composition comprising a polyoxyalkylene ether backbone polymer having a hydrolyzable silicon group at an end of its molecular chain and the reaction product between an amine compound and a carbonyl compound with water removed. Since water has been removed from the reaction product, the composition cannot be fast curing.

SUMMARY OF THE INVENTION

An object of the invention is to provide a room temperature fast curable composition of the condensation curing type which is fast and deeply curable at room temperature.

We have found that a room temperature fast curable composition is obtained by blending (A) a diorganopolysiloxane blocked with a hydroxyl group at both ends of its molecular chain and having a viscosity of 25 to 1,000,000 centistokes at 25° C., (B) a hydrolyzable silane of the formula (1) defined below or a partial hydrolyzate thereof, (C) an organic compound having at least one C=O group in a molecule, and (D) an organic compound having at least one $NH_2$ group in a molecule. The composition cures in the presence of water in air. At the same time as curing, reaction occurs between carbonyl and $NH_2$ groups that components (C) and (D) possess at β-position, to form water at depths, which water facilitates the fast and deep curing of the composition so that curing takes place not only from the surface, but also from the deep interior. Furthermore, since the both terminals of the base oil as component (A) are changed from the hydrolyzable groups to the hydroxyl groups, condensation reaction between these hydroxyl groups and hydrolyzable groups on the crosslinking agent takes place at the same time. These reactions cooperate to achieve outstanding improvements in fast curing and deep curing capabilities. The composition is thus a room temperature fast curable composition which is especially effective as the one part type.

Accordingly the invention provides a room temperature fast curable composition comprising:

(A) 100 parts by weight of a diorganopolysiloxane blocked with a hydroxyl group at both ends of its molecular chain and having a viscosity of 25 to 1,000,000 centistokes (cSt) at 25° C., (B) 2 to 50 parts by weight of a hydrolyzable silane of the following general formula (1):

$$R^1{}_{4-n}SiX_n \qquad (1)$$

wherein $R^1$ is a monovalent hydrocarbon group, X is independently selected from the group consisting of ketoxime, alkoxy, acyloxy, amide, and amino groups, and n is an integer of 2 to 4, or a partial hydrolyzate thereof, (C) an organic compound having at least one C=O group in a molecule, In an amount to give 0.001 to 1 mol of the C=O group per 100 parts by weight of component (A), and (D) an organic compound having at least one $NH_2$ group in a molecule, in an amount to give 0.001 to 1 mol of the $NH_2$ group per 100 parts by weight of component (A).

DESCRIPTION OF THE PREFERRED EMBODIMENTS

Briefly stated, the room temperature fast curable composition of the invention contains as essential components (A) a diorganopolysiloxane blocked with a hydroxyl group at both ends of its molecular chain and having a viscosity of 25 to 1,000,000 centistokes at 25° C., (B) a hydrolyzable silane of the formula (1) or a partial hydrolyzate thereof, (C) an organic compound having at least one C=O group in a molecule, and (D) an organic compound having at least one $NH_2$ group in a molecule.

Component (A) serving as the base polymer is a diorganopolysiloxane which should be blocked with a hydroxyl group at both ends of its molecular chain. On account of the presence of hydroxyl groups, the diorganopolysiloxane (A) can condense with the hydrolyzable silane or partial hydrolyzate thereof (B) to form a cured product in the form of a rubber elastomer.

One preferred diorganopolysiloxane is a both end hydroxyl-blocked diorganopolysiloxane of the average compositional formula shown below.

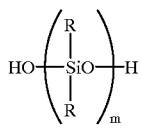

Herein, R is independently a substituted or unsubstituted monovalent hydrocarbon group, and m is such a number that the diorganopolysiloxane may have a viscosity of 25 to 1,000,000 cSt at 25° C.

In the above formula, R may be the same or different and is preferably selected from substituted or unsubstituted monovalent hydrocarbon groups of 1 to 10 carbon atoms, more preferably 1 to 8 carbon atoms. Examples include alkyl groups such as methyl, ethyl, propyl and butyl, cycloalkyl groups such as cyclohexyl, alkenyl groups such as vinyl and allyl, aryl groups such as phenyl and tolyl, aralkyl groups such as benzyl and phenylethyl, and substituted ones of these groups in which some of the hydrogen atoms are replaced by halogen atoms or cyano groups, such as chloromethyl, 3,3,3-trifluoropropyl and cyanoethyl. Of these groups, methyl, phenyl and 3,3,3-trifluoropropyl groups are preferable, with methyl being most preferable.

The diorganopolysiloxane as component (A) or base polymer should have a viscosity of 25 to 1,000,000 cSt at 25° C. and preferably 100 to 200,000 cSt at 25° C. Outside this range, there arise such problems as inefficient working and the difficulty to form a cured rubber having satisfactory properties.

Component (B) is a hydrolyzable silane of the general formula (1) or a partial hydrolyzate thereof.

$$R^1_{4-n}SiX_n \qquad (1)$$

In formula (1), $R^1$ is a monovalent hydrocarbon group preferably of 1 to 10 carbon atoms. Examples include alkyl groups such as methyl, ethyl, propyl, butyl and pentyl, cycloalkyl groups such as cyclopentyl and cyclohexyl, alkenyl groups such as vinyl, allyl, 5-hexenyl and 9-decenyl, aryl groups such as phenyl and tolyl, aralkyl groups such as benzyl and phenylethyl, and substituted ones of these monovalent hydrocarbon groups in which all or some of the hydrogen atoms attached to carbon atoms are replaced by halogen atoms, such as 3,3,3-trifluoropropyl, heptadecafluoropropyl, and chlorophenyl. Of these groups, methyl, ethyl, propyl, vinyl, phenyl and 3,3,3-trifluoropropyl groups are preferable.

X groups are identical or different groups selected from among ketoxime, alkoxy, acyloxy, amide, and amino groups, and preferably ketoxime and alkoxy groups. Letter n is an integer of 2 to 4, and preferably 3 or 4.

The hydrolyzable silane or partial hydrolyzate thereof (B) functions as a crosslinking agent in the inventive composition. Hydrolyzable groups on the silane or partial hydrolyzate are effective for promoting crosslinking by reacting with hydroxyl groups at both ends of the molecular chain of component (A) and at the same time, for promoting further crosslinking by undergoing hydrolytic condensation with water formed by reaction between components (C) and (D) as will be described later.

Illustrative, non-limiting examples of the hydrolyzable silane or partial hydrolyzate thereof are given below. Examples of the ketoxime group-bearing hydrolyzable silane include dimethyldi(butanoxime)silane, methyltri(butanoxime)silane, vinyltri(butanoxime)silane, phenyltri(butanoxime)silane, propyltri(butanoxime)silane, tetra(butanoxime)silane, 3,3,3-trifluoropropyltri(butanoxime)silane, 3-chloropropyltri(butanoxime)silane, methyltri(propanoxime)silane, methyltri(pentanoxime)silane, methyltri(isopentanoxime)silane, vinyltri(cyclopentanoxime)silane, and methyltri(cyclohexanoxime)silane. Examples of the alkoxy group-bearing hydrolyzable silane include dimethyldimethoxysilane, methyltrimethoxysilane, vinyltrimetoxysilane, vinyltriethoxysilane, phenyltrimethoxysilane, methyltriethoxysilane, tetramethoxysilane, tetraethoxysilane, and tetrapropoxysilane. Examples of the acyloxy group-bearing hydrolyzable silane include methyltriacetoxysilane, ethyltriacetoxysilane, phenyltriacetoxysilane, vinyltriacetoxysilane, and tetraacetoxysilane. Examples of the amide group-bearing hydrolyzable silane include methyltri(N-methylacetoamide)silane and ethyltri(N-methylacetoamide)silane. Examples of the amino group-bearing hydrolyzable silane include methyltributylaminosilane, methyltricyclohexylaminosilane, and dimethylditributylaminosilane. These silanes may be used alone or in admixture of two or more.

The amount of component (B) blended is 2 to 50 parts, and preferably 4 to 20 parts by weight per 100 parts by weight of component (A). Less amounts of component (B) obstructs the preparation of the composition whereas excessive amounts of component (B) result in cured elastomers which will not exhibit the desired physical properties.

Component (C) is an organic compound having at least one C=O group in a molecule, which reacts with an organic compound having at least one $NH_2$ group in a molecule as component (D) to produce water serving as a curing agent in the deep interior of the composition.

Any desired organic compound may be used as long as it has at least one reactive C=O group in a molecule. Examples include ketones such as acetone, methyl ethyl ketone, cyclohexanone, and acetophenone, ethyl acetate, butyl acetate, methyl propionate, butyrolactone, acetoacetates such as methyl acetoacetate, ethyl acetoacetate, propyl acetoacetate, and butyl acetoacetate, other esters, amides such as dimethylformamide, diethylacetamide, and butyrolactam, silane coupling agents having the foregoing as a functional group, and oligomers and polymers having the foregoing as functional groups. These compounds may be used alone or in admixture of two or more. Among others, ketones and acetoacetates are especially preferred.

The amount of component (C) blended is to give 0.001 to 1 mol and preferably 0.01 to 0.1 mol of the C=O group per 100 parts by weight of component (A). Less amounts of component (C) fail to achieve satisfactory deep curing whereas excessive amounts of component (C) result in cured elastomers which will not exhibit the desired physical properties.

Component (D) is an organic compound having an amino group, which reacts with component (D) to produce water serving as a curing agent in the deep interior of the composition as described above.

Any desired organic compound may be used as long as it has at least one reactive amino ($NH_2$) group in a molecule. Examples include amines such as methylamine, ethylamine, butylamine, ethylenediamine, and aniline; silane coupling agents having an amino group such as γ-aminopropyltriethoxy-silane, and oligomers and polymers having an amino group. These compounds may be used alone or in admixture of two or more. Among others, primary amine compounds, especially compounds having a primary amino group including silane coupling agents having a primary amino group are preferred.

From the standpoint of steric hindrance during reaction between components (C) and (D), component (D) is preferably an organic compound in which the carbon atom at α-position relative to the amino group is primary, secondary or a part of an aromatic ring. If the carbon atom at α-position is a tertiary carbon atom, then the amino group in component (D) may become less reactive with the carbonyl group in component (C), sometimes failing to achieve the desired effect.

The amount of component (D) blended is to give 0.001 to 1 mol and preferably 0.01 to 0.1 mol of the $NH_2$ group per 100 parts by weight of component (A). Less amounts of component (D) fail to achieve satisfactory deep curing whereas excessive amounts of component (D) result in cured elastomers which will not exhibit the desired physical properties.

Components (C) and (D) are preferably blended such that the molar ratio of C=O to $NH_2$ may range from 1/10 to 10/1, especially from 1/5 to 5/1.

In addition to the foregoing essential components (A) to (D), various other addenda may be added to the composition of the invention insofar as they do not adversely affect the fast curing and deep curing at room temperature. Since it is crucial for the invention that components (C) and (D) react to form water serving as a deep curing agent, organic compounds are, of course, selected for components (C) and (D) so that this type of reaction may instantaneously take place, and various addenda which are optional must be selected so as not to inhibit the formation of water.

Examples of such addenda include condensation catalysts, for example, organic tin catalysts such as organic tin esters and organic tin chelate complexes, organic titanium catalysts such as organic titanate esters and organic titanium chelate complexes, tetramethylguanidylpropyltrimethoxysilane and tetramethylguanidylpropyl-tristrimethylsiloxysilane; fillers such as fumed silica, precipitated silica, quartz flour, carbon powder, talc, bentonite, and magnesium carbonate; fibrous fillers such as asbestos, glass fibers, carbon fibers and organic fibers; coloring agents such as pigments and dyes; heat resistance modifiers such as red iron oxide and cerium oxide; freeze resistance modifiers; rust-preventing agents; tackifiers such as γ-glycidoxypropyltrimethoxysilane; liquid reinforcing agents such as a network polysiloxane consisting of triorganosiloxy units and $SiO_2$ units. These addenda may be used in conventional amounts.

In particular, the condensation catalyst is preferably added in an amount of about 0.001 to 20 parts, and more preferably about 0.01 to 10 parts by weight per 100 parts by weight of the base polymer (A). The preferred condensation catalysts are organic tin catalysts and organic titanium catalysts. More specifically, organic tin catalysts are preferred when the hydrolyzable groups in component (B) are ketoxime groups, and organic tin catalysts and organic titanium catalysts are preferred when the hydrolyzable groups in component (B) are alkoxy groups.

The composition of the invention can be formulated as a room temperature fast curable composition of one part type by uniformly mixing predetermined amounts of components (A) to (D) and optional components and in a dry or anhydrous atmosphere if necessary. To insure shelf stability, component (C) or (D) may be microcapsulated prior to blending into a room temperature fast curable composition of one part type.

Alternatively, the composition of the invention can be formulated as a two part type consisting of X and Y parts wherein the two parts are mixed on use. In one example, X part is composed of components (A), (B) and (C) and Y part is composed of components (A) and (D). In another example, X part is composed of components (A), (B) and (D) and Y part is composed of components (A) and (C). In these examples, X and Y parts can be mixed in a ratio of 1:1, which ensures ease of handling.

The inventive composition thus obtained will cure in the presence of moisture in air. During the process, water forms at depths to induce curing thereat. Both curing from the surface and curing at depths take place at the same time, facilitating fast curing and deep curing. Since the base polymer is blocked at both ends with hydroxyl groups, condensation reaction simultaneously takes place between the hydroxyl groups on the base polymer and the hydrolyzable groups on the crosslinking agent. These processes cooperate to provide improved fast and deep curing.

When the inventive composition is formulated as a two part package whereupon the two parts are mixed on use, the mixing step is very easy on account of the mixing ratio of 1:1. Furthermore, the respective components are readily available. Thus the invention is of great worth in practical application.

Because of the fast curing and deep curing advantages, the inventive composition is very suitable as automobile oil seal material and also useful as sealing agents, adhesives and potting agents in electric and electronic applications where simple, efficient steps are strongly demanded for manufacture.

There has been described a room temperature fast curable composition of the condensation curing type having improved fast and deep curing capabilities.

EXAMPLE

Examples of the invention are given below by way of illustration and not by way of limitation. Note that the viscosity is a measurement at 25° C.

Example 1

A curable silicone rubber composition was prepared by mixing under dry conditions 100 g of dimethylpolysiloxane blocked with a hydroxyl group at each end of its molecular chain and having a viscosity of 5,000 cSt, 3 g of tetramethoxysilane, 0.58 g (0.01 mol) of acetone, 1.29 g (0.01 mol) of n-butylamine, 0.2 g of dibutyltin dilaurate, 50 g of precipitated silica, and 8 g of fumed silica.

The composition was worked into a sheet of 2 mm thick, which was allowed to stand in an atmosphere of 20° C. and RH 55% for one hour. The resulting rubber elastomer was examined for physical properties (hardness, elongation and tensile strength) according to JIS K-6301. The results are shown in Table 1.

Separately, the composition was cast into a glass cylinder having a diameter of 20 mm and a length of 100 mm and allowed to cure in an atmosphere of 20° C. and RH 55% for 5 hours and 24 hours. At the end of curing, the cured product was taken out by breaking the glass cylinder. The thickness of a rubbery elastomer portion (or cured thickness) was measured. The results are also shown in Table 1.

Example 2

A curable silicone rubber composition was prepared by mixing under dry conditions 100 g of dimethylpolysiloxane blocked with a hydroxyl group at each end of its molecular chain and having a viscosity of 20,000 cSt, 6 g of vinyltrimethylethylketoximesilane, 0.98 g (0.01 mol) of cyclohexanone, 2.21 g (0.01 mol) of γ-aminopropyltriethoxysilane, 1.0 g of dibutyltin dioctoate, and 20 g of fumed silica.

The composition was examined for rubber physical properties and cured thickness as in Example 1, with the results shown in Table 1.

Comparative Example 1

A curable silicone rubber composition was prepared by mixing under dry conditions 100 g of dimethylpolysiloxane blocked with a trimethoxysilyl group at each end of its molecular chain and having a viscosity of 5,000 cSt, 0.58 g (0.01 mol) of acetone, 1.29 g (0.01 mol) of n-butylamine, 0.2 g of dibutyltin dilaurate, 50 g of precipitated silica, and 8 g of fumed silica.

The composition was examined for rubber physical properties and cured thickness as in Example 1, with the results shown in Table 1.

Comparative Example 2

A curable silicone rubber composition was prepared by mixing under dry conditions 100 g of dimethylpolysiloxane blocked with a vinyldi(methyl ethyl ketoxime)silyl group at each end of its molecular chain and having a viscosity of 20,000 cSt, 0.98 g (0.01 mol) of cyclohexanone, 2.21 g (0.01 mol) of γ-aminopropyltriethoxysilane, 1.0 g of dibutyltin dioctoate, and 20 g of fumed silica.

The composition was examined for rubber physical properties and cured thickness as in Example 1, with the results shown in Table 1.

TABLE 1

|  | EX1 | EX2 | CE1 | CE2 |
|---|---|---|---|---|
| Hardness (JIS-A) | 30 | 33 | 20 | 15 |
| Elongation (%) | 250 | 450 | 300 | 620 |
| Tensile strength (kgf/cm$^2$) | 25 | 27 | 18 | 20 |
| Cured thickness after 5 hours (mm) | 100 | 100 | 18 | 20 |
| Cured thickness after 24 hours (mm) | 100 | 100 | 100 | 100 |

Japanese Patent Application No. 11-049281 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A room temperature fast curable composition comprising:
   (A) 100 parts by weight of a diorganopolysiloxane blocked with a hydroxyl group at both ends of its molecular chain and having a viscosity of 25 to 1,000,000 centistokes at 25° C.,
   (B) 2 to 50 parts by weight of a hydrolyzable silane of the following general formula (1):

$$R^1{}_{4-n}SiX_n \tag{1}$$

wherein $R^1$ is a monovalent hydrocarbon group, X is independently selected from the group consisting of ketoxime, alkoxy, acyloxy, amide, and amino groups, and n is an integer of 2 to 4, or a partial hydrolyzate thereof,
   (C) at least one organic compound having at least one C=O group in a molecule, in an amount to give 0.001 to 1 mol of the C=O group per 100 parts by weight of component (A), and
   (D) an organic compound having at least one $NH_2$ group in a molecule, in an amount to give 0.001 to 1 mol of the $NH_2$ group per 100 parts by weight of component (A).

2. The composition of claim 1 further comprising
   (E) 0.001 to 20 parts by weight of an organic tin catalyst per 100 parts by weight of component (A).

3. The composition of claim 1 wherein X of formula (1) is a ketoxime or alkoxy group.

4. The composition of claim 1 wherein component (C) is a ketone and/or an acetoacetate.

5. The composition of claim 1 wherein component (D) is a primary amine compound.

* * * * *